United States Patent [19]

Buzak

[11] Patent Number: 4,583,825
[45] Date of Patent: * Apr. 22, 1986

[54] ELECTRO-OPTIC DISPLAY SYSTEM WITH IMPROVED VIEWING ANGLE

[75] Inventor: Thomas S. Buzak, Beaverton, Oreg.

[73] Assignee: Tektronix, Inc., Beaverton, Oreg.

[*] Notice: The portion of the term of this patent subsequent to Sep. 17, 2002 has been disclaimed.

[21] Appl. No.: 565,442

[22] Filed: Dec. 27, 1983

[51] Int. Cl.[4] ............................................. G02F 1/133
[52] U.S. Cl. ..................................... 350/335; 350/337; 350/347 E; 350/388
[58] Field of Search ................ 350/335, 347 R, 347 E, 350/377, 378, 388, 387, 408, 346, 352

[56] References Cited

U.S. PATENT DOCUMENTS

| | | | |
|---|---|---|---|
| 2,753,763 | 12/1952 | Haines | 350/388 X |
| 2,834,254 | 5/1958 | Sage | 350/388 X |
| 3,272,988 | 9/1966 | Bloom et al. | 350/377 X |
| 3,558,215 | 1/1971 | Lang et al. | 350/377 X |
| 3,785,721 | 1/1974 | Harsch | 350/347 E |
| 3,838,906 | 10/1974 | Kumada | 350/150 |
| 3,869,195 | 3/1975 | Aldrich et al. | |
| 3,887,791 | 6/1975 | Kitchens | 235/1 D |
| 3,915,553 | 10/1975 | Adams | |
| 3,923,379 | 12/1975 | Kumada | |
| 3,966,305 | 6/1976 | Young | 350/160 LC |
| 4,088,400 | 5/1978 | Assouline et al. | 353/20 |
| 4,097,128 | 6/1978 | Matsumoto et al. | 350/335 |
| 4,120,567 | 10/1978 | Goodman et al. | 350/350 |
| 4,183,630 | 1/1980 | Funada et al. | 350/334 |
| 4,192,060 | 3/1980 | Washizuka et al. | 29/592 R |
| 4,239,349 | 12/1980 | Scheffer | |
| 4,385,806 | 5/1983 | Fergason | 350/347 R |
| 4,398,803 | 8/1983 | Pohl et al. | 350/347 R |
| 4,408,839 | 10/1983 | Wiener-Avnear | 350/347 R |
| 4,497,542 | 2/1985 | Kaye | 350/335 |

FOREIGN PATENT DOCUMENTS

WO82/03467 5/1982 PCT Int'l Appl. .

Primary Examiner—John K. Corbin
Assistant Examiner—David Lewis
Attorney, Agent, or Firm—John D. Winkelman; Paul S. Angello

[57] ABSTRACT

A method and an apparatus provide an optical switching system (10) which provides independent of viewing angle two system optical transmission states of substantially contaminant-free light. The system includes first and second light gates (12 and 12') of which each has associated therewith contaminant light intensity patterns (48 and 66) with points of local maxima (54, 56, 58, 60, 68, and 70) and local minima (62 and 72) in two system optical transmission states. The contaminant light intensity patterns are oriented so that the points of local maxima and minima of the contaminant light intensity patterns of one of the light gates generally align with the respective points of local minima and maxima of the contaminant light intensity patterns of the other light gate. The alignment of contaminant light intensity patterns blocks the transmission of contaminant light in two system optical transmission states, and thereby provides improved viewing angle performance.

12 Claims, 11 Drawing Figures

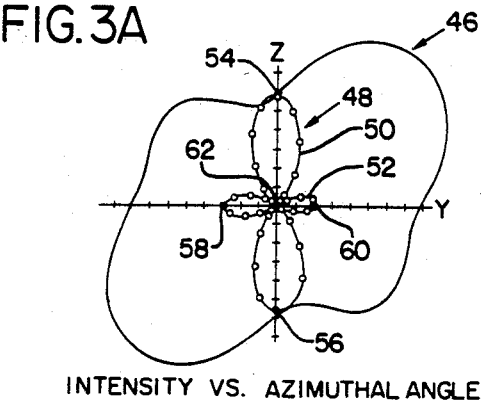
FIG. 3A
INTENSITY VS. AZIMUTHAL ANGLE
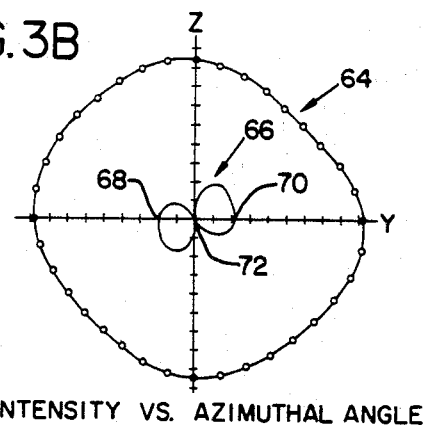
FIG. 3B
INTENSITY VS. AZIMUTHAL ANGLE
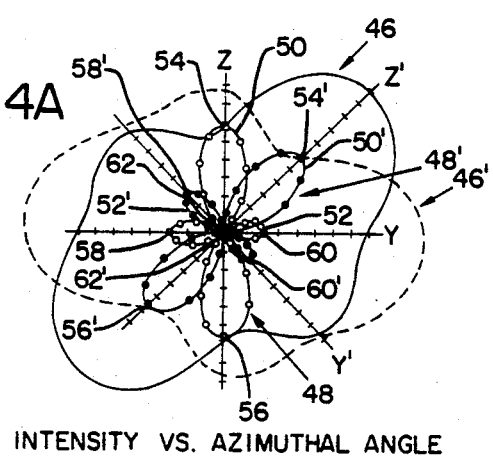
FIG. 4A
INTENSITY VS. AZIMUTHAL ANGLE
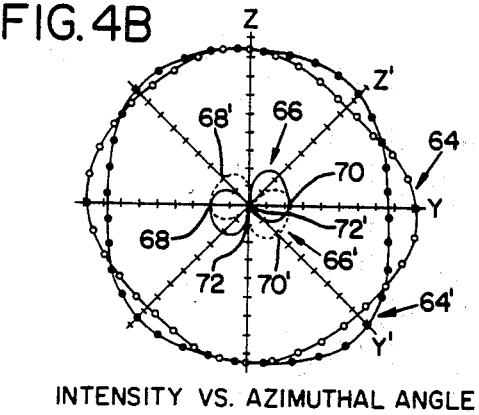
FIG. 4B
INTENSITY VS. AZIMUTHAL ANGLE
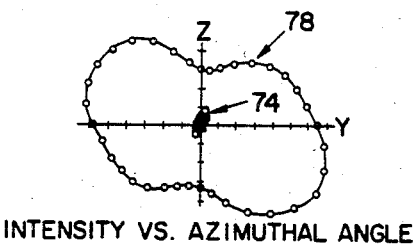
FIG. 5A
INTENSITY VS. AZIMUTHAL ANGLE
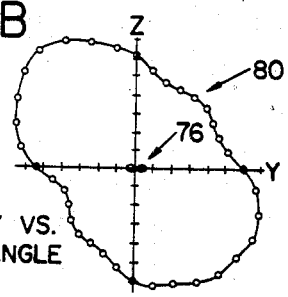
FIG. 5B
INTENSITY VS. AZIMUTHAL ANGLE
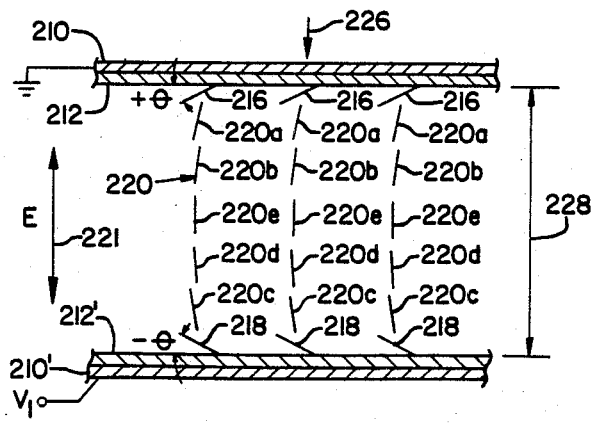
FIG. 7A (ON)
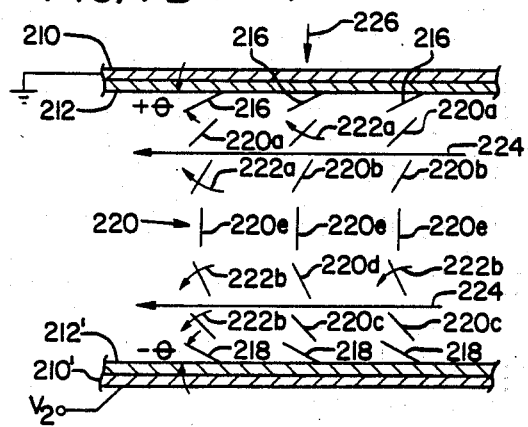
FIG. 7B (OFF)

ELECTRO-OPTIC DISPLAY SYSTEM WITH IMPROVED VIEWING ANGLE

TECHNICAL FIELD

This invention relates to optical switches, and in particular, a method and an apparatus for an optical switching system which develops independent of viewing angle a system optical transmission state of substantially contaminant-free light.

BACKGROUND OF THE INVENTION

An optical switching system employing an electro-optic device which exhibits the effects of birefringence, such as a liquid crystal cell, does not transmit light of uniform intensity when the system output is observed from different locations along a viewing cone defined at an angle measured relative to the axis or path of the transmitted light. The nonuniform intensity of light changes the contrast of the display and is caused by the spurious transmission of contaminant light whose intensity varies as a function of azimuthal angle along the viewing cone. In the case of an optical switching system which develops two optical transmission states of light of different colors, the effect of birefringence is that light rays exiting the system in either one of its optical transmission states includes contaminant light rays of the color of the other optical transmission state which vary in intensity at different locations along the viewing cone.

There have been known heretofore methods and apparatus for improving the off-axis viewing angle performance of optical switches incorporating electro-optic devices which comprise birefringent materials. One class of patents discloses methods and apparatus for improving the viewing angle characteristics of twisted nematic liquid crystal display devices.

In particular, U.S. Pat. No. 4,385,806 of Fergason discloses the introduction into a twisted nematic liquid crystal assembly of at least two retardation plate devices arranged in a particular manner to improve the off-axis viewing angle performance of the device.

U.S. Pat. No. 4,192,060 of Washizuka et al. discloses a twisted nematic liquid crystal cell whose transparent electrodes have undergone a horizontal orientation rubbing process to obtain a preferred director alignment and thereby improve the viewing angle characteristics of the liquid crystal cell.

U.S. Pat. No. 4,183,630 of Funada et al. discloses the use of a fiber plate which includes a plurality of optical fibers positioned adjacent the outer surface of one of a pair of substrates which form an inclusion for a layer of twisted nematic liquid crystal material. The use of the fiber plate is said to preserve the uniformity of display contrast as the voltage applied to the liquid crystal cell is reduced.

U.S. Pat. No. 4,120,567 of Goodman et al. discloses the method for increasing the viewing angle of a twisted nematic liquid crystal cell by increasing the ratio of the voltage applied to the cell to its threshold voltage.

U.S. Pat. No. 3,966,305 of Young discloses the deposition of a dielectric layer between the patterned conductive layer and the director alignment film of a twisted nematic liquid crystal display device in an attempt to improve the viewing angle of the display.

A second class of patents discloses techniques directed to either filtering undesirable ambient light or introducing a source of back-lighting to enhance display contrast and thereby provide a more desirable viewing angle.

In particular, U.S. Pat. No. 3,887,791 of Kitchens discloses the use of a prism overlaying display cells positioned in a casing to alter the angle of light transmission of the display images and thereby provide an improved viewing angle. The use of a prism, however, only shifts the angle of transmission of the display and filters undesirable ambient light. The prism does not correct for nonuniform contrast as the display is observed from different azimuthal angles of a particular cone of view.

U.S. Pat. No. 3,869,195 of Aldrich et al. discloses the use of segmented back-lighting of a liquid crystal display as a means to improve the viewing angle thereof. The source of segmented back-lighting is an electroluminescent layer in which one transparent electrode applied to the electroluminescent material is segmented to coincide with the segmentation of the liquid crystal panel. The effect is to provide high intensity contrast between the activated display segments and the nonactivated areas of the display over a wide range of ambient light conditions.

A third class of patents discloses the use of ancillary optical components with optical switching systems to enhance display contrast.

Included in this class of patents is U.S. Pat. No. 4,088,400 of Assouline et al. which discloses an electro-optical display device having positioned adjacent its exit polarizer a diffuser element in association with an additional polarizer to improve the viewing angle of the display without loss of contrast. A pair of quarter-wave plates is disposed on opposite sides of the diffuser element to eliminate back-scattering of ambient light to the observer's eye. The method of Assouline et al. appears to be inapplicable for increasing the contrast of reflection-type liquid crystal displays.

U.S. Pat. No. 3,838,906 of Kumada discloses an optical switch comprising an electro-optic crystal and a birefringent crystal arranged in cascade in a manner such that the sign of the birefringence of the former is opposite to that of the latter. Kumada states that this arrangement of electro-optic devices provides an optical switch which can effectively block in its opaque output state light having an incident angle as great as 30°.

SUMMARY OF THE INVENTION

One of the objects of this invention is to provide a method for producing in an optical switching system independent of viewing angle an optical transmission state of substantially contaminant-free light.

Another object of this invention is to provide such a method which includes the steps of positioning along an optical path two light gates, each of which comprising an electro-optic device having associated therewith contaminant light intensity patterns, and orienting the light gates so that a contaminant light intensity pattern of either one of the light gates serves to block the transmission of contaminant light of the other light gate.

A further object of this invention is to provide such a method which improves the viewing angle performance of optical switching systems employing electro-optic devices of different types.

Still another object of this invention is to provide such a method which develops in an optical switching system independent of viewing angle two system optical transmission states of substantially contaminant-free colored light.

Yet another object of this invention is to provide an optical switching system which develops a system optical transmission state of substantially contaminant-free light in accordance with the method of the present invention.

The present invention relates to a method and an apparatus for providing an optical switching system which has independent of viewing angle a system optical transmission state of substantially contaminant-free light. The method of the present invention entails the use of a first light gate which includes an electro-optic device means that is capable of changing the sense of the polarization state of the light rays passing therethrough. The first light gate is in optical communication with a source of light and develops an optical transmission state of polarized light having associated therewith a contaminant light intensity pattern with points of local minima and maxima.

A second light gate is positioned to receive the polarized light rays exiting the first light gate and provides an optical transmission state having associated therewith a contaminant light intensity pattern with points of local minima and maxima. The contaminant light intensity patterns of the first and second light gates are oriented so that the points of local minima and maxima of the contaminant light intensity pattern of one of the light gates generally align with the respective points of local maxima and minima of the contaminant light intensity pattern of the other light gate. The above-described method for alignment of the contaminant light intensity patterns provides independent of viewing angle a system optical transmission state of substantially contaminant-free light.

A preferred embodiment of the apparatus of the present invention comprises first and second light gates of which each one includes a pair of linear polarizing filter means having orthogonally aligned polarization axes and one electro-optic device means which is capable of changing the direction of polarization of light rays passing therethrough. The second light gate is of a design similar to that of the first light gate and is positioned along an optical path to receive the polarized light rays exiting the first light gate. The second light gate is oriented axially about the optical path relative to the first light gate so that the points of high attenuation of the contaminant light intensity pattern of one of the light gates generally overlap the points of low attenuation of the contaminant light intensity pattern of the other light gate such that the contaminant light rays from both light gates are blocked.

In a preferred embodiment, the electro-optic device means comprise variable optical retarders having substantially the same contaminant light intensity patterns. Whenever the light gates comprise color selective linear polarizing filter means, the optical switching system develops independent of viewing angle two system optical transmission states of light of different pure colors. Whenever the light gates comprise only neutral linear polarizing filter means, the optical switching system develops independent of viewing angle an opaque system optical transmission state through which essentially no spurious light is transmitted and a system optical transmission state of substantially contaminant-free light.

The principles of operation underlying the present invention are applicable to optical switching systems comprising in whole or in part electro-optic devices other than variable optical retarders, such as, for example, twisted nematic liquid crystal devices. The best performance is obtained, however, from optical switching systems incorporating electro-optic devices of the same type.

Additional objects and advantages of the present invention will be apparent from the following detailed description of a preferred embodiment thereof, which proceeds with reference to the aocompanying drawings.

BRIEF DESCRIPTION OF THE DRAWINGS

FIGS. 3A and 3B are superimposed contaminant color and nominal color light intensity patterns measured at a polar viewing angle of 40° at the output of either one of the light gates of FIG. 1 in, respectively, the first optical transmission state and the second optical transmission state.

FIGS. 4A and 4B show the relative orientation of the superimposed contaminant color and nominal color light intensity patterns of FIGS. 3A and 3B for the pair of light gates of the optical switching system of FIG. 1 in, respectively, the first optical transmission state and the second optical transmission state.

FIGS. 5A and 5B are superimposed contaminant color and nominal color light intensity patterns which represent the light intensity patterns of the optical switching system of FIG. 1 in, respectively, the first optical transmission state and the second optical transmission state.

FIGS. 7A and 7B are schematic diagrams of the director alignment configuration of the liquid crystal cell of the zero to substantially half-wave optical retarder incorporated in a preferred embodiment of the optical switching system of the present invention in, respectively, the field aligned "ON" state and the partly relaxed "OFF" state.

DETAILED DESCRIPTION OF PREFERRED EMBODIMENT LIGHT GATE OPERATION

Figure 1:
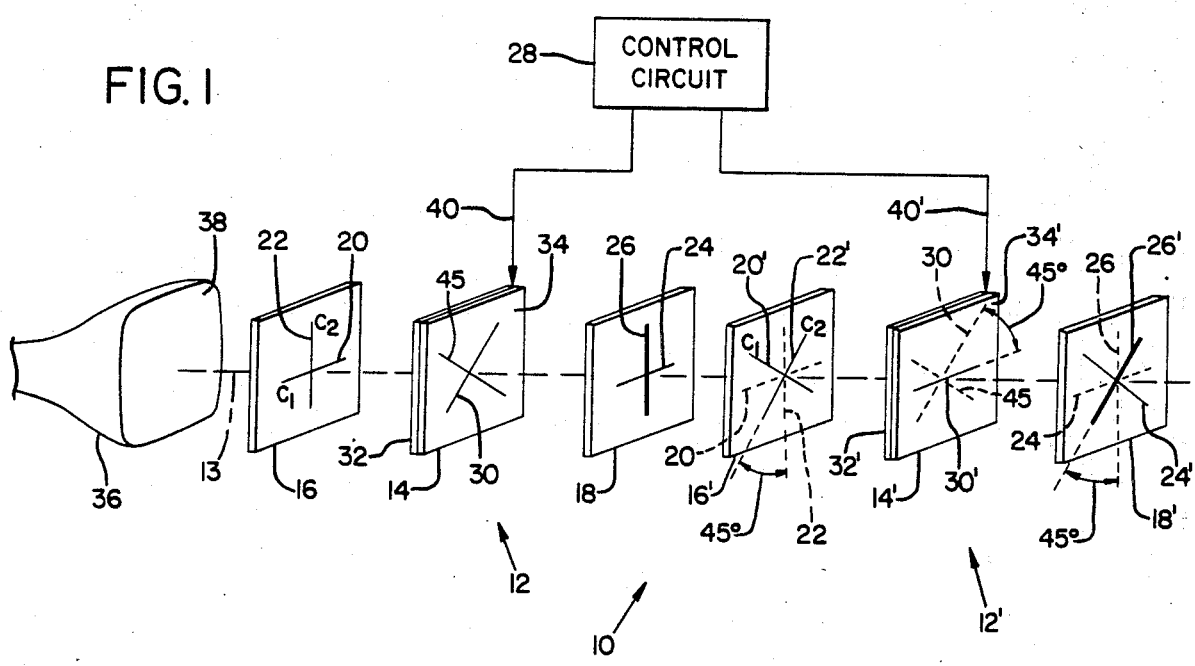
FIG. 1 is a diagram of a preferred embodiment of an optical switching system which develops two optical transmission states of light of different colors and incorporates the principles of operation underlying the method of the present invention.

The principles of operation underlying the method of the present invention are described by way of example of an optical switching system 10 which develops two optical transmission states of light of different colors and is shown in FIG. 1. With reference to FIG. 1, optical switching system 10 includes a pair of light gates 12 and 12' which are of similar design and are positioned in series arrangement along optical path 13. As will be further hereinafter described, light gates 12 and 12' differ only in the relative angular orientation about optic axis 13 of the optical components of one light gate and those of the other light gate. The following description of the configuration of the optical components and operation of light gate 12 is similarly applicable to light gate 12'. The elements of light gate 12' which correspond to those of light gate 12 are designated with identical reference numerals followed by primes.

Light gate 12 includes variable optical retarder 14 which is disposed between a pair of linear polarizing filters or means 16 and 18, each having orthogonally aligned polarization axes. Variable optical retarder 14 constitutes an electro-optic device means which is capable of changing the sense of the polarization state of light rays passing therethrough. Polarizing filter 16 has a color selective horizontal polarization axis 20 which passes light of a first color $C_1$, such as green, and a color selective vertical polarization axis 22 which passes light of a second color $C_2$, such as red. Polarizing filter 18 is a neutral polarizing filter and has a light transmitting horizontal polarization axis 24 which passes white light and light absorbing vertical polarization axis 26 which passes no light.

Variable optical retarder 14 is a nematic liquid crystal cell and comprises a zero to substantially half-wave optical retarder which selectively provides nearly zero retardation for normally incident light of all colors and substantially half-wave retardation of normally incident light of a preselected color in response to a change in magnitude of an AC voltage which is applied to the cell by control circuit 28. For reasons relating not to the presence of contaminant light due to viewing angle but only to the light gate operation, which is described hereinbelow, variable optical retarder 14 is designed to provide substantially half-wave optical retardation of green light in order to develop at the output of light gate 12 two optical transmission states of light of different pure colors.

The projection 30 of the optic axis of variable optical retarder 14 on each of its two light communicating surfaces 32 and 34 is disposed substantially at a 45° angle with respect to each one of the polarization axes of polarizing filters 16 and 18.

The light gate formed by polarizing filters 16 and 18 and variable optical retarder 14 is positioned in front of a light source 36, which emits light of many wavelengths including those of the colors green and red. Light source 36 can be, for example, a cathode ray tube or a projection device which provides a black and white display image on its phosphor screen 38.

Variable optical retarder 14 is switched between two optical retardation states, the "ON" state which provides nearly zero retardation of normally incident light and the "OFF" state which provides substantially half-wave retardation for normally incident light of a particular predetermined wavelength. The two optical retardation states provide light gate 12 with two optical transmission states for developing light of different colors.

Whenever variable optical retarder 14 is commanded to the "ON" optical retardation state by a voltage signal applied to output conductor 40 of control circuit 28, the directions of polarization of light rays of the colors green and red passing therethrough remain unchanged. Normally incident light rays of the color red passing through vertical polarization axis 22 of polarizing filter 16 are absorbed by vertical polarization axis 26 of polarizing filter 18. Normally incident light rays of the color green passing through horizontal polarization axis 20 of polarizing filter 16 exit light gate 12 through horizontal polarization axis 24 of polarizing filter 18. Green light exits light gate 12 in its first optical transmission state.

Whenever variable optical retarder 14 is commanded to the "OFF" optical retardation state by a voltage signal applied to output conductor 40 of control circuit 28, the direction of polarization of light rays of the color green passing through horizontal polarization axis 20 of polarizing filter 16 is rotated 90° by variable optical retarder 14. The light rays of the color green are absorbed by vertical polarization axis 26 of polarizing filter 18.

Since variable optical retarder 14 in the "OFF" optical retardation state does not provide substantially half-wave retardation of light rays of colors other than green, the direction of polarization of light rays of the color red passing through vertical polarization axis 22 of polarizing filter 16 is rotated at an angle which is slightly different from 90° by variable optical retarder 14. Light rays of the color red, therefore, are separated into components which lie along the vertical and horizontal polarization axes of polarizing filter 18. Light rays of the color red include major components of light projected onto and transmitted by horizontal polarization axis 24 and minor components of light projected onto and absorbed by vertical polarization axis 26 of polarizing filter 18. Red light exits light gate 12 in its second optical transmission state. The slight amount of red light absorbed by vertical polarization axis 26 of polarizing filter 18 results in a virtually imperceptible diminution in red light intensity in the second optical transmission state as respects the green light intensity in the first optical transmission state.

CONTAMINANT AND NOMINAL LIGHT INTENSITY PATTERNS

The light rays exiting polarizing filter 18 of light gate 12 in both the first and second optical transmission states appear to be of pure color quality to an observer whose line of sight or viewing angle is normal to the surface of polarizing filter 18. When observed from a viewing angle other than normal to the surface of polarizing filter 18, the light rays exiting light gate 12 in either one of its optical transmission states includes contaminant light rays of the color of the other optical transmission state.

Figure 2:
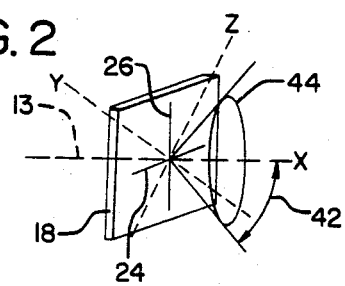
FIG. 2 is a diagram of the cone of view for a polar angle of 40° at the output of a light gate included in the optical switching system of FIG. 1.

FIG. 2 shows for a polar angle 42 of 40° the cone of view 44 for an observer of the light rays exiting polarizing filter 18. FIGS. 3A and 3B show superimposed contaminant color and nominal color light intensity patterns represented as a function of azimuthal angle at a polar viewing angle of 40°. The Z and Y axes of FIGS. 3A and 3B coincide with, respectively, projection 30 of the optic axis and projection 45 of the axis perpendicular to projection 30 of the optic axis of variable optical retarder 14.

FIG. 3A shows superimposed intensity patterns of green and red light exiting polarizing filter 18 when light gate 12 is in its first optical transmission state. Pattern 46 represents the intensity of green light, and pattern 48 represents the intensity of the contaminant red light. Pattern 48 resembles the outline of a pair of orthogonally oriented figure eight shapes 50 and 52 which are aligned generally symmetrically about the respective Z and Y axes. Figure eight shape 50 has points local maxima at locations 54 and 56, and figure eight shape 52 has points of local maxima at locations 58 and 60. Both of the figure eight shapes 50 and 52 have points of local minima located approximately at the point of intersection 62 of the Z and Y axes. Intersection point 62 represents the point of convergence of each of the intensity nulls of the four lobes of pattern 48. Since the intensity varies as a function of azimuthal angle, the intensity nulls occur at azimuthal angles measured at approximately 45° with respect to the Z and Y axes. It is readily noted that the contaminant red light intensity at locations 54 and 56 of figure eight shape 50 equal that of the intended green light output. The shapes of the outlines of patterns 46 and 48 are characteristic of those exhibited by liquid crystal cells of various types.

FIG. 3B shows superimposed intensity patterns of green and red light exiting polarizing filter 18 when light gate 12 is in its second optical transmission state. Pattern 64 represents the intensity of red light, and pattern 66 represents the intensity of contaminant green light. Pattern 66 resembles the outline of a figure eight shape generally aligned about the Y axis. Pattern 66 has points of local maxima at locations 68 and 70 and points of local minima located at approximately at the point of intersection 72 of the Z and Y axes. Intersection point 72 represents the point of convergence of each of the intensity nulls of the two lobes of pattern 66. It is readily noted that the rate of diminution of contaminant light intensity from the points of local maxima is less rapid in the second optical transmission state than in the first optical transmission state. The number, orientation, and shape of the lobes included in the outlines of patterns 64 and 66 are unique to the liquid crystal cell of the preferred embodiment of the variable optical retarder whose construction and method of operation are described hereinbelow.

ALIGNMENT OF LIGHT INTENSITY PATTERNS

With reference to FIG. 1, the method of the present invention comprises the steps of positioning light gate 12' at the output of light gate 12 along optical path 13 to receive the polarized light rays exiting therefrom. Voltage signals applied to output conductor 40' of control circuit 28 command variable optical retarder 14' to its "ON" and "OFF" optical retardation states in synchronism with variable optical retarder 14. The corresponding optical components of light gates 12 and 12' are of similar design so that color selective polarizing filter 16' passes green light through polarization axis 20' and red light through polarization axis 22', neutral polarizing filter 18' passes light of all wavelengths through polarization axis 24' and absorbs light of all wavelengths by polarization axis 26', and variable optical retarder 14' provides substantially half-wave optical retardation of green light. As will be described hereinbelow, light gate 12' develops in its first and second optical transmission states an output of, respectively, green light and red light.

Light gate 12' is oriented relative to light gate 12 such that the projection 30 of the optic axis of variable optical retarder 14 is disposed at a 45° angle with respect to the projection 30' of the optic axis of variable optical retarder 14' and the polarization axes of polarizing filters 16 and 18 are disposed at 45° angles with respect to the polarization axes of polarizing filters 16' and 18'. The polarization axes and projection of the optic axis of the optical components of light gate 12 are shown in phantom on the corresponding optical components of light gate 12' to illustrate the above-described relative alignment.

Whenever variable optical retarders 14 and 14' are commanded to the "ON" optical retardation state, light rays of the color green exit light gate 12 through horizontal polarization axis 24 of polarizing filter 18 and enter light gate 12' by striking polarizing filter 16'. Normally incident light rays of the color green have equal components which strike polarization axes 20' and 22' of polarizing filter 16'. The components of green light striking polarization axis 22' are absorbed, and the components of green light striking polarization axis 20' are transmitted through polarizing filter 16'. Variable optical retarder 14' in the "ON" optical retardation state imparts no change in the direction of polarization of light rays passing therethrough; therefore, light rays of the color green exit light gate 12' and optical switching system 10 through polarization axis 24' of polarizing filter 18'.

It is apparent that the relative orientation of light gates 12 and 12' in accordance with the present invention causes 50% of the green light to be absorbed by polarization axis 22' of polarizing filter 18', and thereby a 50% reduction in green light intensity at the output of optical switching system 10 in the first optical transmission state.

Whenever variable optical retarders 14 and 14' are commanded to the "OFF" optical retardation state, light rays of the color red exit light gate 12 through horizontal polarization axis 24 of polarizing filter 18 and enter light gate 12' by striking polarizing filter 16'. Normally incident light rays of the color red have equal components which strike polarization axes 20' and 22' of polarizing filter 16'. The components of red light striking polarization axis 20' are absorbed, and the components of red light striking polarization axis 22' are transmitted through polarizing filter 16'. Since variable optical retarder 14' in the "OFF" optical retardation state does not provide substantially half-wave retardation of light rays of colors other than green, the direction of polarization of light rays of the color red passing through polarization axis 22' of polarizing filter 16' is rotated at an angle which is slightly different from 90° by variable optical retarder 14'. Light rays of the color red, therefore, are separated into components which lie along the polarization axes of polarizing filter 18'. Light rays of the color red include major components of light projected onto and transmitted by polarization axis 24' and minor components of light projected onto and absorbed by polarization axis 26' of polarizing filter 18'.

It is apparent that the relative orientation of light gates 12 and 12' in accordance with the present invention causes 50% of the red light to be absorbed by polarization axis 20' of polarizing filter 18', and thereby a 50% reduction in red light intensity at the output of optical switching system 10 in the second optical transmission state. The slight amount of red light absorbed by polarization axis 26' of polarizing filter 18' does not appreciably diminish the red light intensity in the second optical transmission state.

FIGS. 4A and 4B show the relative orientations of the superimposed contaminant color and nominal color light intensity patterns for the arrangement shown in FIG. 1 of light gates 12 and 12' in, respectively, the first optical transmission state and the second optical transmission state. The pertinent features of the light intensity patterns of light gate 12' corresponding to those of light gate 12 are designated in FIGS. 4A and 4B with identical reference numerals followed by primes.

With reference to FIG. 4A, the light intensity patterns associated with the first optical transmission states of light gates 12 and 12' are aligned such that locations 54' and 56' of the points of local maxima of figure eight shape 50' and locations 58' and 60' of the points of local maxima of figure eight shape 52' are all generally aligned with location 62 of the points of local minima. Similarly, locations 54 and 56 of the points of local maxima of figure eight shape 50 and locations 58 and 60 of the points of local maxima of figure eight shape 52 are all generally aligned with location 62' of the points of local minima. The points of local minima of a light intensity pattern define points of substantial attentuation of light intensity; therefore, aligning the points of high intensity contaminant light of either one of the light gates with the points of substantial attenuation light intensity of the other light gate effectively blocks the contaminant red light from exiting polarizing filter 18' of optical switching system 10.

With reference to FIG. 4B, the light intensity patterns associated with the second optical transmission states of light gates 12 and 12' are aligned such that locations 68' and 70' of the points of local maxima of figure eight shape 66' are generally aligned with location 72 of the points of local minima. Similarly, locations 68 and 70 of the points of local maxima of figure eight shape 66 are generally aligned with location 72' of the points of local minima. In a manner analogous to that described for the first optical transmission state, the points of local minima are aligned with the points of local maxima to block the transmission of contaminant green light from exiting polarizing filter 18' of optical switching system 10.

The light intensity patterns are preferably aligned to obtain the best reduction of contaminant light exiting system 10 in the first optical transmission state. The consequent reduction of contaminant light intensity in the second optical transmission state is realized primarily because of the lesser amount of contaminant light separately transmitted by each one of light gates 12 and 12'.

With reference to FIGS. 5A and 5B, the light intensity patterns 74 and 76 shown at the intersection of the Z and Y axes represents the resultant contaminant light intensity patterns of optical switching system 10 in, respectively, the first optical transmission state and the second optical transmission state. The amount of contaminant light exiting system 10, therefore, is negligible in both the first and second optical transmission states for polar angles within a range of between 0° and at least 40°. It has been demonstrated that good viewing angle performance can be obtained with the present invention for polar angles as great as 55°. Patterns 78 and 80 represent the resultant intensity of, respectively, green light in the first optical transmission state and red light in the second optical transmission state of optical switching system 10.

The foregoing discussion directed to the optical switching system 10 which provides two optical transmission states of light of different colors is applicable to such a system which provides an opaque optical transmission state. Optical switching system 10 is modified by substituting a neutral linear polarizing filter for each one of color selective polarizing filters 16 and 16' to produce an alternative optical switching system having a single light output optical transmission state and an opaque optical transmission state. The absorption axis of the substituted neutral polarizing filter in each light gate is orthogonally disposed to that of the existing neutral polarizing filter of the same light gate. The variable optical retarders are tuned to provide substantially half-wave retardation of a wavelength of light in the mid-range of the visible spectrum.

Whenever the variable optical retarders are in the "ON" optical retardation state, the alternative optical switching system transmits no light through its output filter. Whenever the variable optical retarders are in the "OFF" optical retardation state, the alternative optical switching system transmits white light through its output filter. Each separate light gate manifests the presence of contaminant light as a loss of contrast in the single light output optical transmission state and as the presence of spurious light in the opaque optical transmission state. The arrangement of the light gates in accordance with the method of the present invention virtually eliminates the presence of contaminant light in both optical transmission states.

It will be appreciated by those having ordinary skill in the art that the above-described contaminant light intensity compensation method can be applied to a reflective type as well as a transmissive type optical switching system.

Liquid Crystal Variable Optical Retarder

The preferred embodiment of the apparatus of the present invention incorporates a pair of liquid crystal cells operating as zero to substantially half-wave optical retarders 14 and 14'. Each such liquid crystal cell controls the retardation of light passing therethrough in response to the intensity of an electric field produced by an excitation voltage applied to the cell electrode structures. The liquid crystal cell described herein exhibits the light intensity patterns depicted in FIGS. 3A and 3B.

Figure 6:
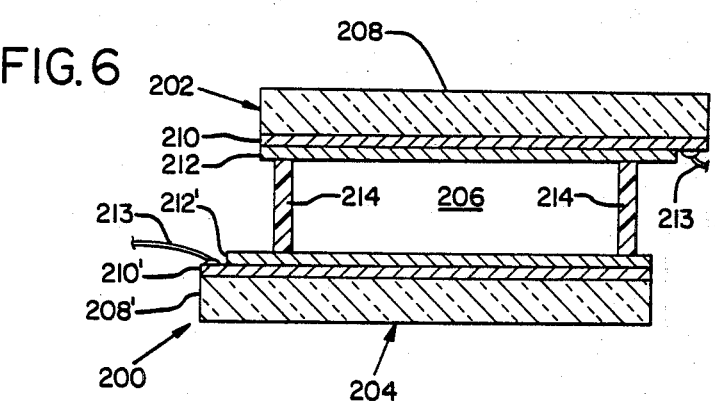
FIG. 6 is a diagrammatic cross-sectional side elevation view of the liquid crystal cell which is used as a zero to substantially half-wave optical retarder in a preferred embodiment of the present invention.

With reference to FIG. 6, a liquid crystal cell 200 includes a pair of generally parallel, spaced-apart electrode structures 202 and 204 with nematic liquid crystal material 206 included therebetween. Electrode structure 202 comprises glass dielectric substrate 208 which has on its inner surface a layer 210 of electrically conducting, but optically transparent, material such as indium tin oxide. Director alignment film layer 212 is applied to conductive layer 210 and forms a boundary between electrode structure 202 and liquid crystal material 206. The surface of film 212 which contacts the liquid crystal material is conditioned in accordance with one of two preferred methods to promote a preferred orientation of the directors of the liquid crystal material in contact therewith. The materials constituting and the corresponding methods of conditioning the director alignment film 212 are described in detail hereinbelow. Electrode structure 204 is of a construction similar to that of electrode structure 202, and the components corresponding to those of electrode structure 202 are shown with identical reference numerals followed by primes.

The short length edges of electrode structures 202 and 204 are offset relative to each other to provide access to conductive layers 210 and 210' for connecting at terminals 213 the conductors of the output of control circuit 28. Spacers 214 may be comprised of any suitable material such as glass fiber to preserve the general parallel relation between electrode structures 202 and 204.

With reference to FIGS. 7A and 7B, the nematic director alignment configuration of layers 212 and 212' in liquid crystal cell 200 is described in Column 7, lines 48–55, of U.S. Pat. No. 4,333,708 of Boyd, et al. It will be understood, however, that the liquid crystal cell described in the Boyd, et al. patent differs from that of the present invention in that the former includes an alternating-tilt geometry type configuration of which the director alignment of cell 200 comprises only a portion. The cell of the Boyd, et al. patent is constructed to promote disclination movement within the cell in an attempt to provide a bistable switching device.

The film layer 212 of electrode structure 202 is conditioned so that the electrode structure surface contacting directors 216 are aligned parallel to each other at a tilt bias angle $+\theta$, which is measured in the counterclockwise sense with reference to the surface of film layer 212. The film layer 212' of electrode structure 204 is conditioned so that the electrode structure surface contacting directors 218 are aligned parallel to each other at a tilt bias angle $-\theta$ which is measured in the clockwise sense with reference to the surface of film layer 212'. Thus, liquid crystal cell 200 is fabricated so that the surface contacting directors 216 and 218 of the opposed surfaces of director alignment layers 212 and 212' of electrode structures 202 and 204, respectively, are tilt-biased in opposite directions.

A first preferred method of effecting the desired alignment of the surface contacting directors entails the use of polyimide as the material which comprises the alignment film layers 212 and 212' on electrode structures 202 and 204, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 212 and 212' of electrode structures 202 and 204, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 7A depicts the orientation of surface noncontacting directors 220 when an AC signal $V_1$ of approximately 2 kHz and 20 Vrms is applied to conductive layers 210 and 210' of electrode structures 202 and 204, respectively. The signal $V_1$ on conductive layer 210' constitutes a first switching state produced at the output of control circuit 28 and produces an alternating electric field, E, between electrode structures 202 and 204 within the liquid crystal cell 200 to force the cell into its "ON" optical retardation state. A substantial number of the surface noncontacting directors 220 of a liquid crystal material 206 which has a positive anisotropy value align essentially end-to-end along direction 221 of the electric field flux lines within the cell, which direction is normal to the conditioned surfaces of the electrode structures. Thus, when cell 200 is excited into its "ON" optical retardation state, the surface noncontacting directors 220 are aligned perpendicularly to the surfaces of the cell.

FIG. 7B depicts the orientation of surface noncontacting directors 220 after the signal $V_1$ is removed so that the alignment of surface noncontacting directors is influenced not by an electric field produced between electrode structures 202 and 204 within the cell, but by the intermolecular elastic forces which cause relaxation of the surface noncontacting directors from the end-to-end alignment of the "ON" optical retardation state. The removal of signal $V_1$ constitutes a second switching state produced at the output of control circuit 28. The director orientation shown in FIG. 7B corresponds to that of the "OFF" optical retardation state of the cell.

Switching cell 200 to the "OFF" optical retardation state can also be accomplished by applying to the cell an AC signal $V_2$ produced at the output of control circuit 28 having a voltage level which is less than that of signal $V_1$ and generally about 0.1 V. The frequency of signal $V_2$ is generally the same as that of signal $V_1$.

During the transition from the "ON" optical retardation state to the "OFF" optical retardation state of the liquid crystal cell, the surface noncontacting directors recede from the end-to-end alignment normal to the electrode structure surfaces and attempt to assume a generally parallel relation with the adjacent directors. Thus, surface noncontacting directors 220a and 220b rotate in a clockwise sense as shown by direction arrows 222a in order to achieve a near-parallel relation as respects directors 216 and 220a, respectively; and surface noncontacting directors 220c and 220d rotate in a counterclockwise sense as shown by direction arrows 222b to achieve a near-parallel relation as respects directors 218 and 220c, respectively. Thus, when cell 200 relaxes to its "OFF" optical retardation state, each one of a substantial number of the surface noncontacting directors is aligned so that it projects a director component onto the surfaces of the cell. The surface noncontacting directors, however, lie approximately in a plane which is perpendicular to the surfaces of the cell.

The method of operating the liquid crystal cell 200 as a zero to substantially half-wave optical retarder is directed to the disclination-free surface noncontacting director relaxation from the electric field aligned or "ON" optical retardation state depicted by FIG. 7A to the planar configuration or "OFF" optical retardation state depicted by FIG. 7B.

In the present invention, liquid crystal cell 200 is operated as a zero to substantially half-wave optical retarder whose optic axis corresponds to the alignment direction of the nonsurface contacting directors 220.

Linearly polarized light which propagates in direction 226 normal to the surfaces of electrode structures 202 and 204 is coincident with the direction of surface noncontacting directors 220 when the liquid crystal cell is in the "ON" optical retardation state. Directors 220 are oriented in such "ON" optical retardation state so that there is a negligible projection of the optic axis on the electrode structure surfaces of the cell. Under these conditions, liquid crystal cell 200 produces substantially reduced optical retardation for incident light propagating in the direction 226.

Linearly polarized light which propagates in direction 226 normal to the surfaces of electrode structures 202 and 204 is noncoincident with the alignment direction of surface noncontacting directors when the liquid crystal cell is in the "OFF" optical retardation state. Directors 220 are oriented in such "OFF" optical retardation state so that each one of a substantial number of them projects a component on the electrode structure surfaces of the cell. Under these conditions, liquid crystal cell 200 has an effective birefringence for generally normally incident light. The orientation of surface noncontacting directors 220 provides substantially half-wave optical retardation for light of the wavelength which satisfies the mathematical expression:

$\Delta nd/\lambda = \frac{1}{2}$ where d represents the thickness 228 and Δn represents the effective birefringence of the cell.

It will be obvious to those having skill in the art that many changes may be made in the above-described details of the preferred embodiment of the present invention. The scope of the present invention, therefore, should be determined only by the following claims.

I claim:

1. In an optical switching system in optical communication with a source of light and comprising a first light gate which includes an electro-optic device means and a linear polarizing filter means with orthogonally aligned polarization axes and which provides an optical transmission state having associated therewith a contaminant light intensity pattern with points of local minima and maxima, a contaminant intensity compensation method comprising:
   positioning a second light gate to receive the light transmitted through the output of the first light gate, the second light gate including an electro-optic device means and a linear polarizing filter means with orthogonally aligned polarization axes and providing an optical transmission state having associated therewith a contaminant intensity pattern with points of local minima and maxima; and
   orienting the contaminant light intensity patterns of the first and second light gates so that the points of local minima and maxima of the contaminant light intensity pattern of one of the light gates generally align with the respective points of local maxima and minima of the contaminant light intensity pattern of the other light gate and that the polarization axes of the linear polarizing filter means of one of the light gates are disposed at an angle relative to the polarization axes of the linear polarizing filter means of the other light gate, thereby to provide independent of viewing angle a system optical transmission state of substantially contaminant-free light.

2. The method of claim 1 in which the electro-optic device means of the first and second light gates are of the same device type and construction.

3. The method of claim 1 in which the angle of disposition is substantially 45°.

4. The method of claim 1 in which each one of the light gates provides an additional contaminant optical transmission state having a contaminant light intensity pattern with points of local minima and maxima, and the contaminant light intensity patterns of the light gates are oriented to provide independent of viewing angle two system optical transmission states of substantially contaminant-free light.

5. The method of claim 4 in which the source of light emits light rays of a plurality of wavelengths and the two system optical transmission states produce substantially contaminant-free light of different colors.

6. A contaminant light intensity-compensated optical switching system in optical communication with a source of light, comprising:
   first light gate means for providing an optical transmission state having associated therewith a contaminant light intensity pattern with points of local minima and maxima, the first light gate means including a first electro-optic device means which is capable of changing the sense of the polarization state of light passing therethrough and a first light polarizing means which comprises a linear polarizing filter means having orthogonally aligned polarization axes;
   second light gate means for providing an optical transmission state having associated therewith a contaminant light intensity pattern with points of local minima and maxima, the second light gate means including a second electro-optic device means which is capable of changing the sense of the polarization state of light passing therethrough and a second light polarizing means which comprises a linear polarizing filter means having orthogonally aligned polarization axes;
   the second light gate means being positioned to receive the light transmitted by the first light gate means and the contaminant light intensity pattern thereof being oriented so that the points of local minima and maxima of the contaminant light intensity pattern of one of the light gate means generally align with the respective points of local maxima and minima of the contaminant light intensity pattern of the other light gate means and that the polarization axes of the linear polarizing filter means of the first light gate means are disposed at an angle relative to the polarization axes of the linear polarizing filter means of the second light gate means; and
   control means in communication with the first and second electro-optic device means to provide independent of viewing angle a system optical transmission state of substantially contaminant-free light.

7. The optical switching system of claim 6 in which at least one of the first and second electro-optic devices means comprises a variable optical retarder.

8. The optical switching system of claim 7 in which the variable optical retarder includes a liquid crystal cell comprising liquid crystal material which has directors and is contained between a pair of generally parallel electrode structures, each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surfaces being defined in a rotational sense opposite to the tilt bias angles of the directors in contact with the other conditioned surface.

9. The optical switching system of claim 6 in which each one of the first and second electro-optic device means includes a variable optical retarder that has an optic axis and a light communicating surface onto which the optic axis is projected, tle projection of the optic axis on the light communicating surface of one of the electro-optic device means being oriented at substantially a 45° angle relative to that of the other electro-optic device means.

10. A contaminant light intensity-compensated optical switching system in optical communication with a source of light that emits light rays of a plurality of wavelengths, comprising:
   first light gate means for providing an optical transmission state having associated therewith a contaminant light intensity pattern with points of local minina and maxima, the first light gate means including a first electro-optic device means which is capable of changing the sense of the polarization state of light passing therethrough and a light polarizing means which includes a color selective filter means;
   second light gate means for providing an optical transmission state having associated therewith a contaminant light intensity pattern with points of local minima and maxima, the second light gate means including a second electro-optic device means which is capable of chsnging the sense of the polarization state of light passing therethrough and a light polarizing means which includes a color selective filter means, the second light gate means being positioned to receive the light transmitted by the first light gate means and the contaminant light intensity pattern thereof being oriented so that the points of local minima and maxima of the contaminant light intensity pattern of one of the light gate means generally align with the respective points of local maxima and minima of the contaminant light intensity pattern of the other light gate means; and control means in communications with the first and second electro-optic device means to provide independent of viewing angle a system optical transmission state of substantially contaminant-free colored light.

11. The optical switching system of claim 6 in which the source of light emits light rays of a plurality of wavelengths and the linear polarizing filters means of each one of the first and second light gates is a color selective filter, thereby to provide a system optical transmission state of colored light.

12. The optical switching system of claim 6 in which the angle of disposition is substantially 45°.

* * * * *